United States Patent
Kim

(10) Patent No.: US 11,181,003 B2
(45) Date of Patent: Nov. 23, 2021

(54) FIRST-STAGE TURBINE VANE SUPPORTING STRUCTURE AND GAS TURBINE INCLUDING SAME

(71) Applicant: DOOSAN HEAVY INDUSTRIES & CONSTRUCTION CO., LTD., Changwon-si (KR)

(72) Inventor: Dong Hwa Kim, Seoul (KR)

(*) Notice: Subject to any disclaimer, the term of this patent is extended or adjusted under 35 U.S.C. 154(b) by 34 days.

(21) Appl. No.: 16/181,293

(22) Filed: Nov. 5, 2018

(65) Prior Publication Data

US 2019/0153883 A1 May 23, 2019

(30) Foreign Application Priority Data

Nov. 21, 2017 (KR) .................... 10-2017-0155404

(51) Int. Cl.
*F01D 11/00* (2006.01)
*F01D 9/04* (2006.01)
(Continued)

(52) U.S. Cl.
CPC ............ *F01D 11/005* (2013.01); *F01D 9/041* (2013.01); *F02C 3/04* (2013.01); *F02C 7/28* (2013.01);
(Continued)

(58) Field of Classification Search
CPC .... F01D 11/005; F01D 11/006; F01D 11/008; F01D 11/003; F01D 11/001
(Continued)

(56) References Cited

U.S. PATENT DOCUMENTS 6,609,885 B2 * 8/2003 Mohammed-Fakir ...................... F01D 9/041 415/191
6,637,753 B2 * 10/2003 Mohammed-Fakir ...................... F01D 11/005 277/416

(Continued)

FOREIGN PATENT DOCUMENTS

KR 10-2007-0108065 A 11/2007
KR 10-2011-0021933 A 3/2011
KR 10-2016-0064018 A 6/2016

OTHER PUBLICATIONS

A Korean Office Action dated Dec. 18, 2018 in connection with Korean Patent Application No. 10-2017-0155404 which corresponds to the above-referenced U.S. application.

*Primary Examiner* — J. Todd Newton
*Assistant Examiner* — Cameron A Corday
(74) *Attorney, Agent, or Firm* — Harvest IP Law, LLP

(57) ABSTRACT

A first-stage turbine vane supporting structure reduces chordal leakage between a first-stage turbine vane segment and its supporting ring. The structure includes a first-stage turbine vane segment including an outer platform, an inner platform, and a first-stage turbine vane disposed between the inner and outer platforms; an inner rail protruding from the inner platform in a longitudinal direction of the first-stage turbine vane; a supporting ring for supporting the first-stage turbine vane segment by engaging with the inner rail while facing one surface of the inner rail; a supporting member engaging with the supporting ring to define a U-shaped space bordered by three side surfaces surrounding the inner rail; and a flexible member interposed between the inner rail and one of the three side surfaces of the U-shaped space. A protrusion formed on the inner rail engages with a sealing surface of the supporting ring in an airtight manner.

12 Claims, 12 Drawing Sheets

(51) Int. Cl.
*F02C 7/28* (2006.01)
*F02C 3/04* (2006.01)

(52) U.S. Cl.
CPC .. *F05D 2220/3212* (2013.01); *F05D 2240/12* (2013.01); *F05D 2240/56* (2013.01); *F05D 2240/57* (2013.01); *F05D 2250/183* (2013.01); *F05D 2250/712* (2013.01)

(58) Field of Classification Search
USPC ..................................................... 415/199.5
See application file for complete search history.

(56) References Cited

U.S. PATENT DOCUMENTS

| | | | |
|---|---|---|---|
| 6,719,295 B2* | 4/2004 | Mohammed-Fakir | F01D 11/005 277/411 |
| 6,752,592 B2* | 6/2004 | Mohammed-Fakir | F01D 11/005 415/139 |
| 7,160,078 B2* | 1/2007 | Coign | F01D 9/041 29/889.22 |
| 2016/0153294 A1* | 6/2016 | Graf | F01D 9/023 415/208.2 |

* cited by examiner

【FIG 1】
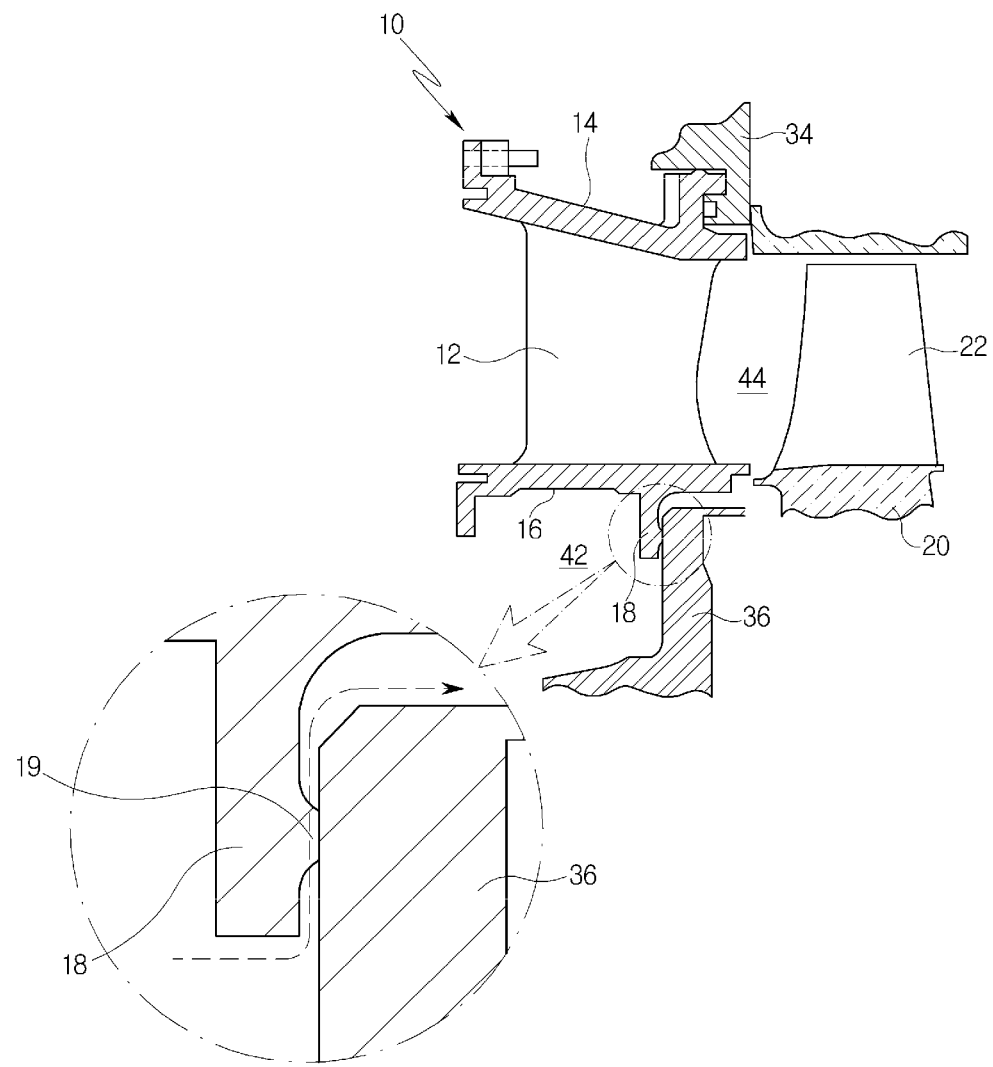
Related Art

[FIG 2]
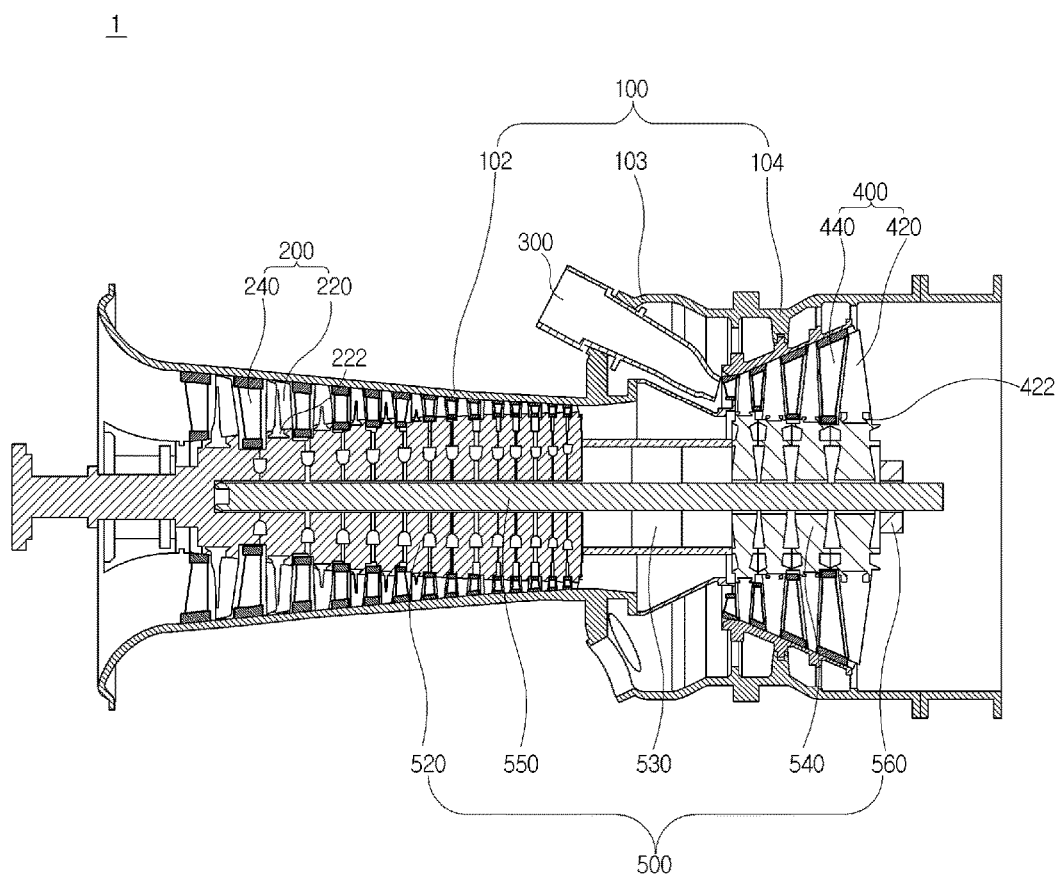

[FIG 3]
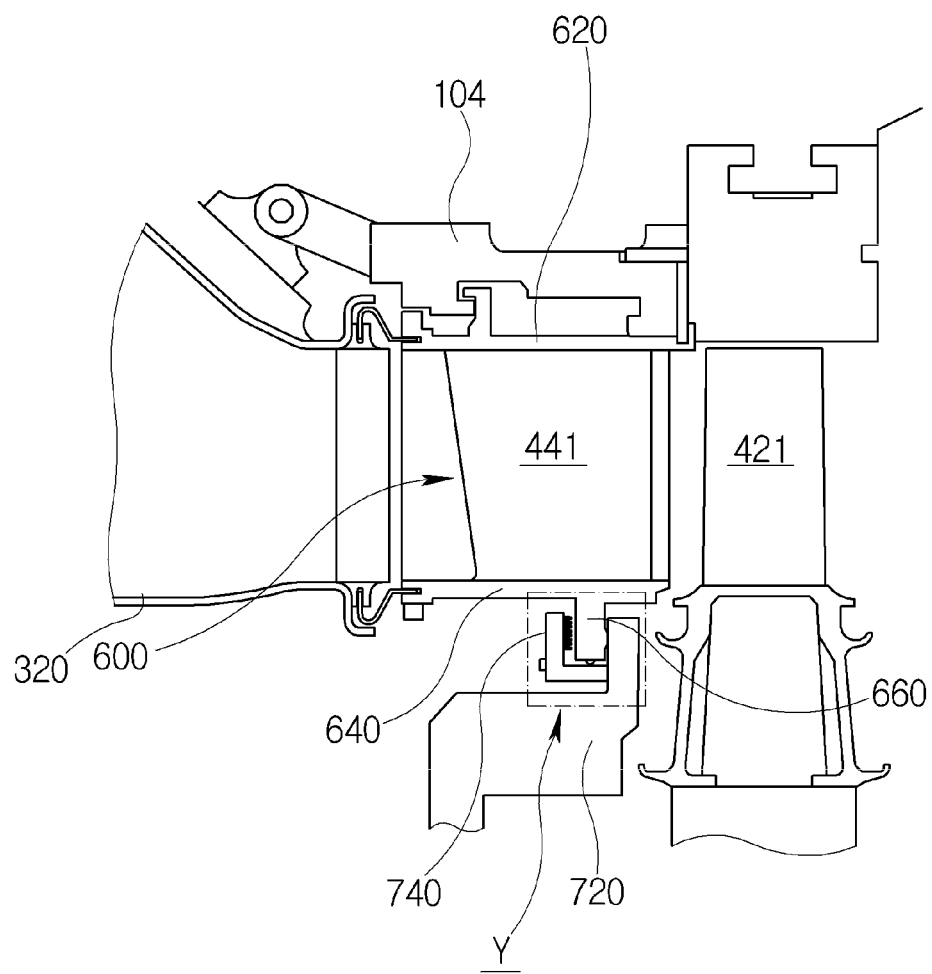

[FIG 4]
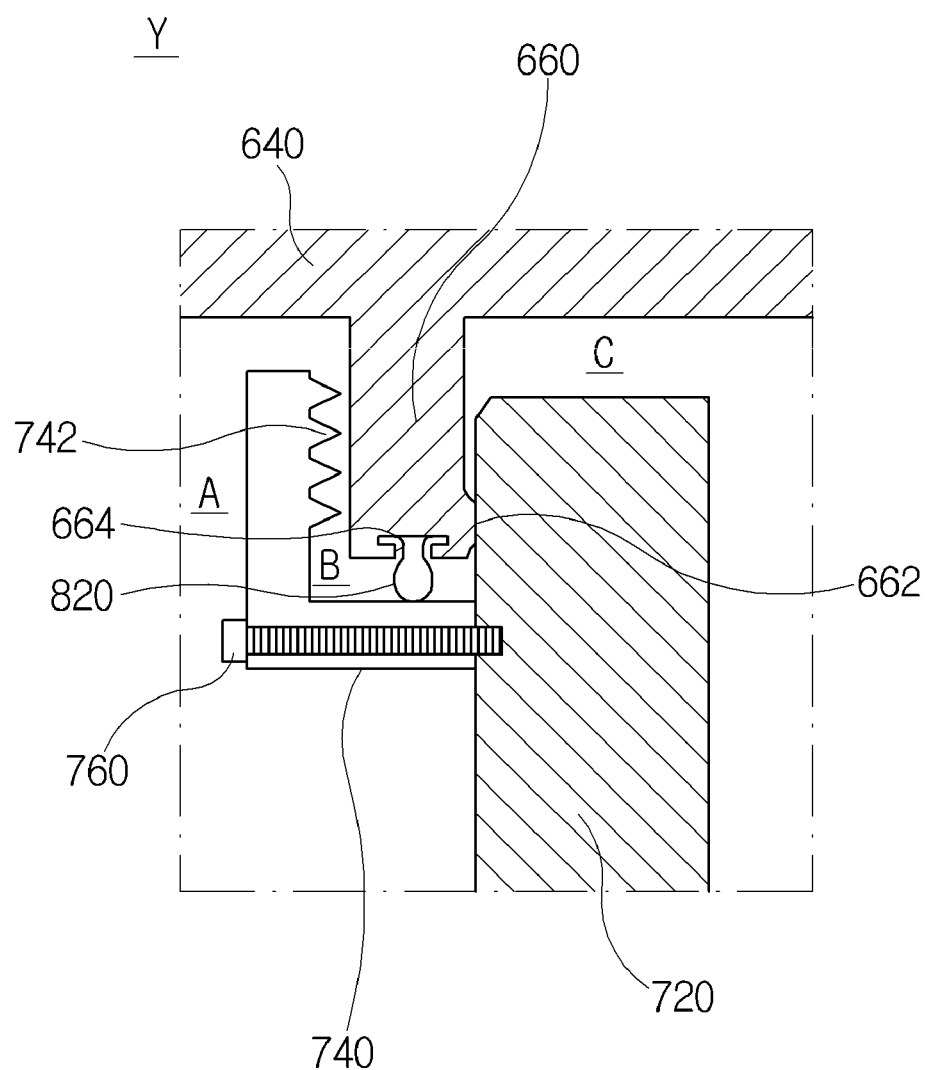

[FIG 5]
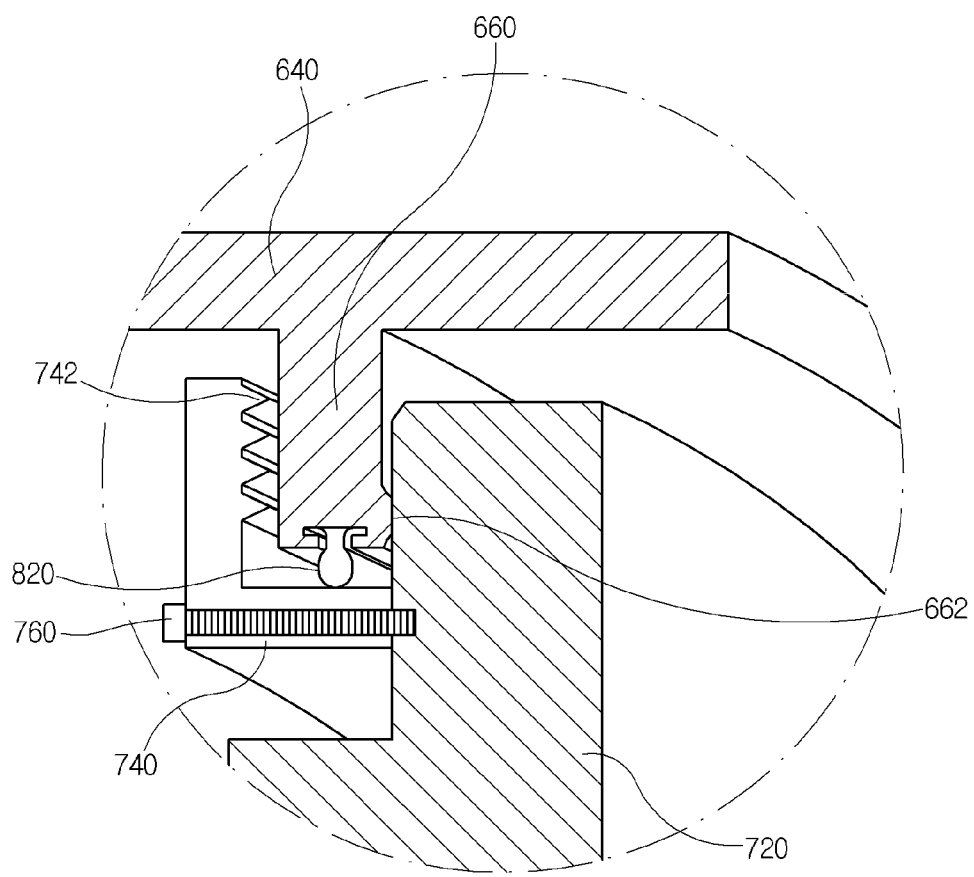

[FIG 6]
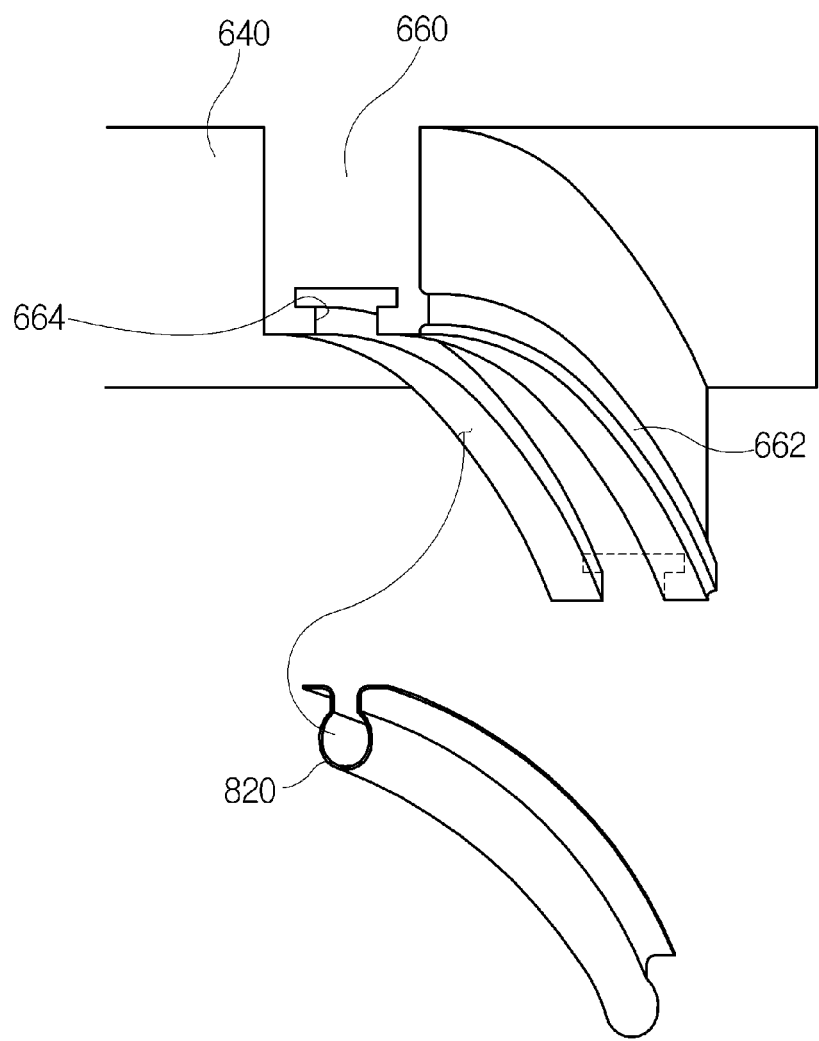

[FIG 7]
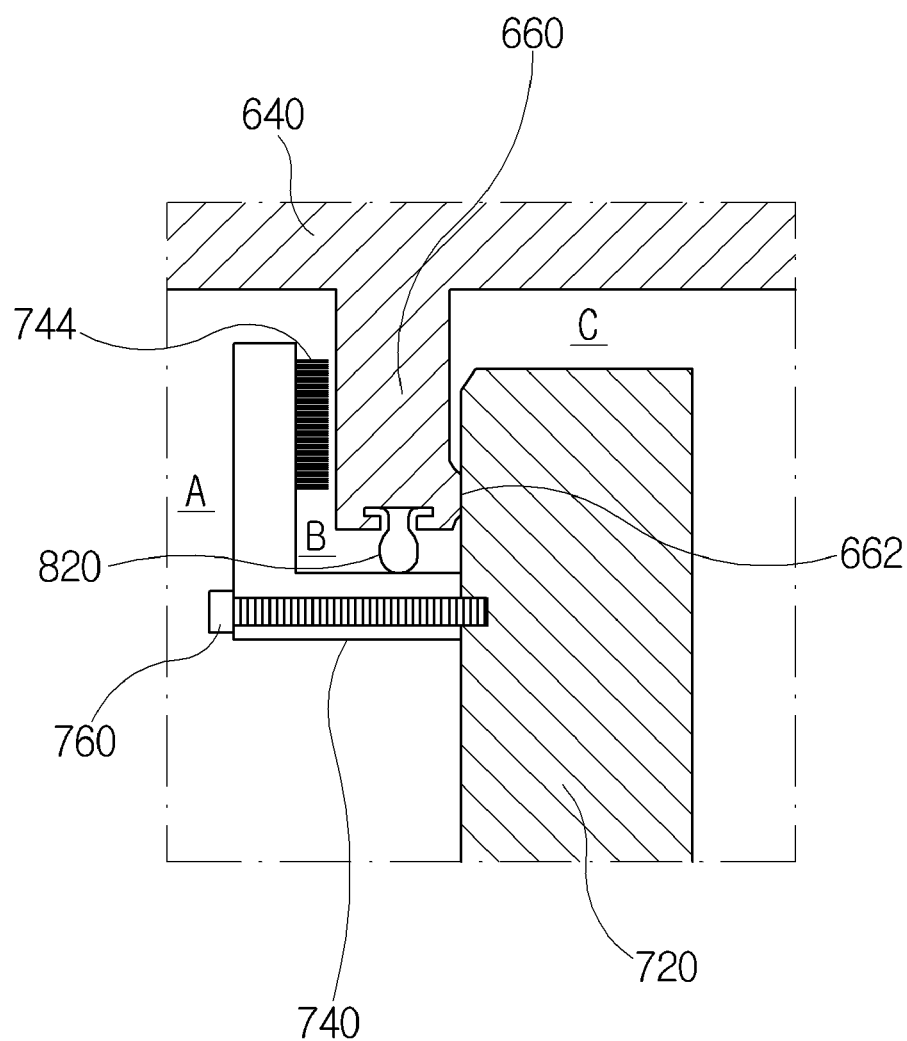

[FIG 8]
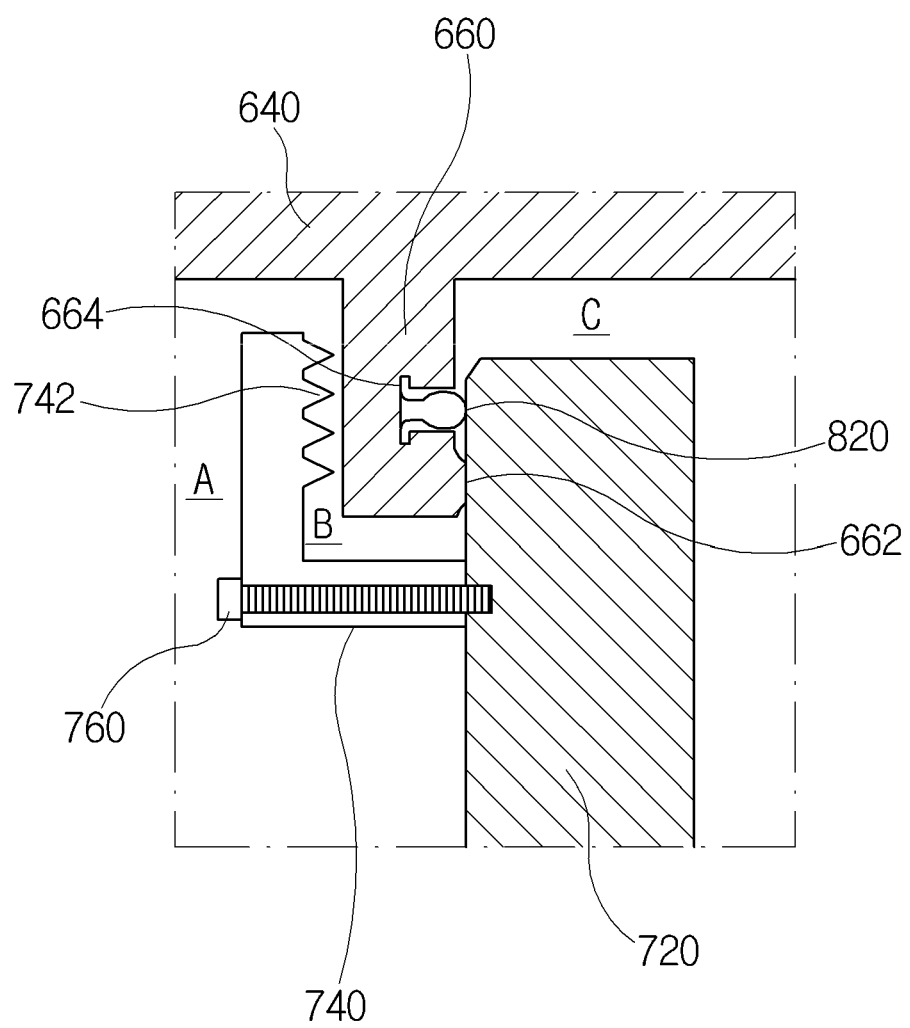

[FIG 9]
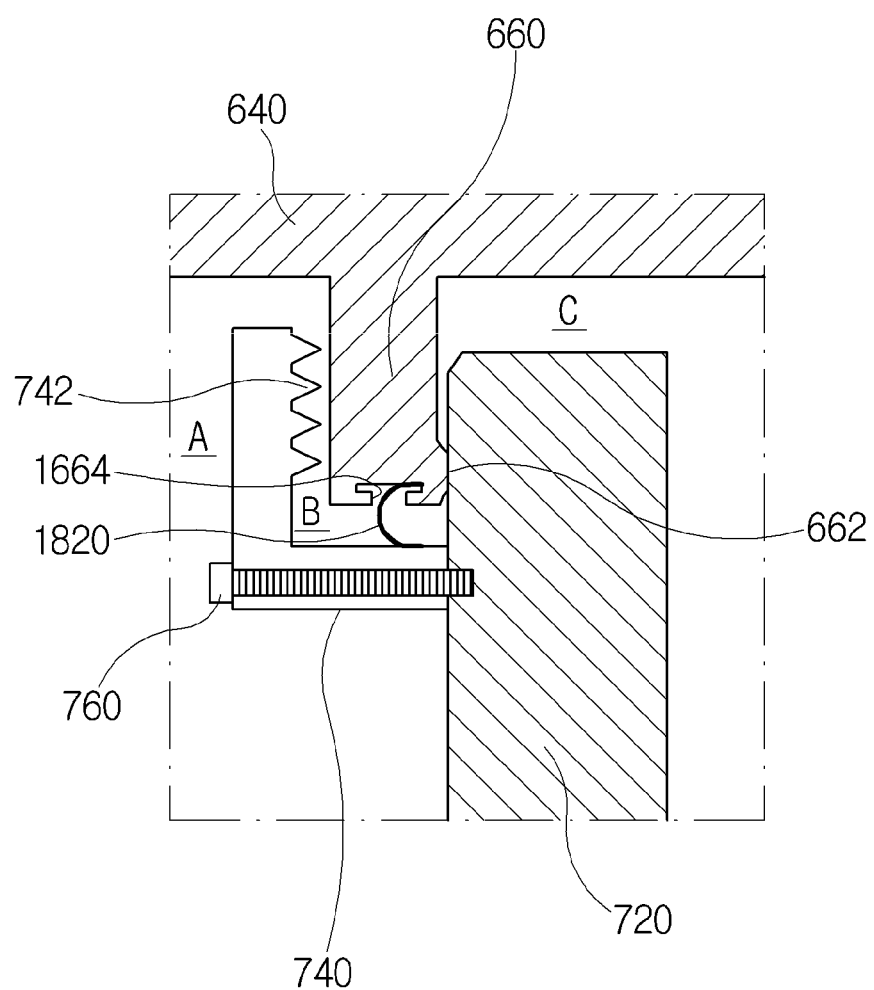

[FIG 10]
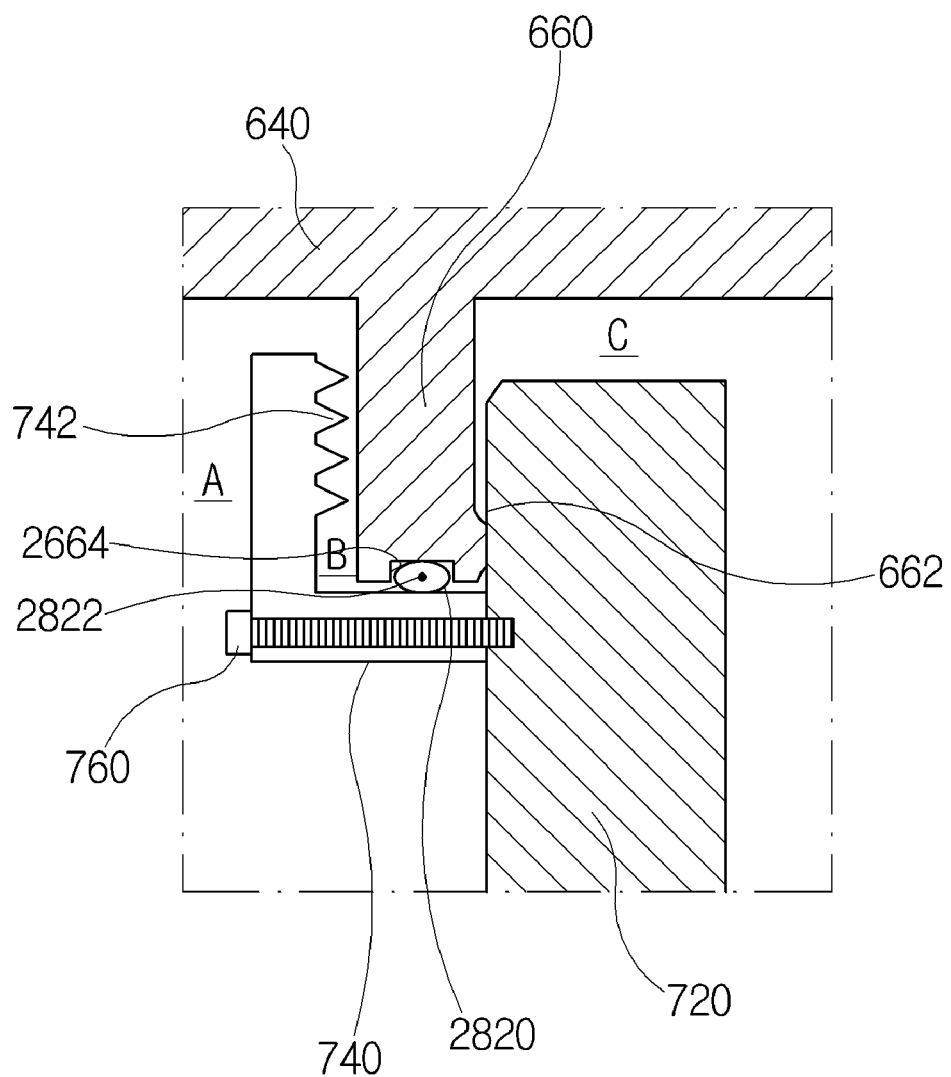

[FIG 11]
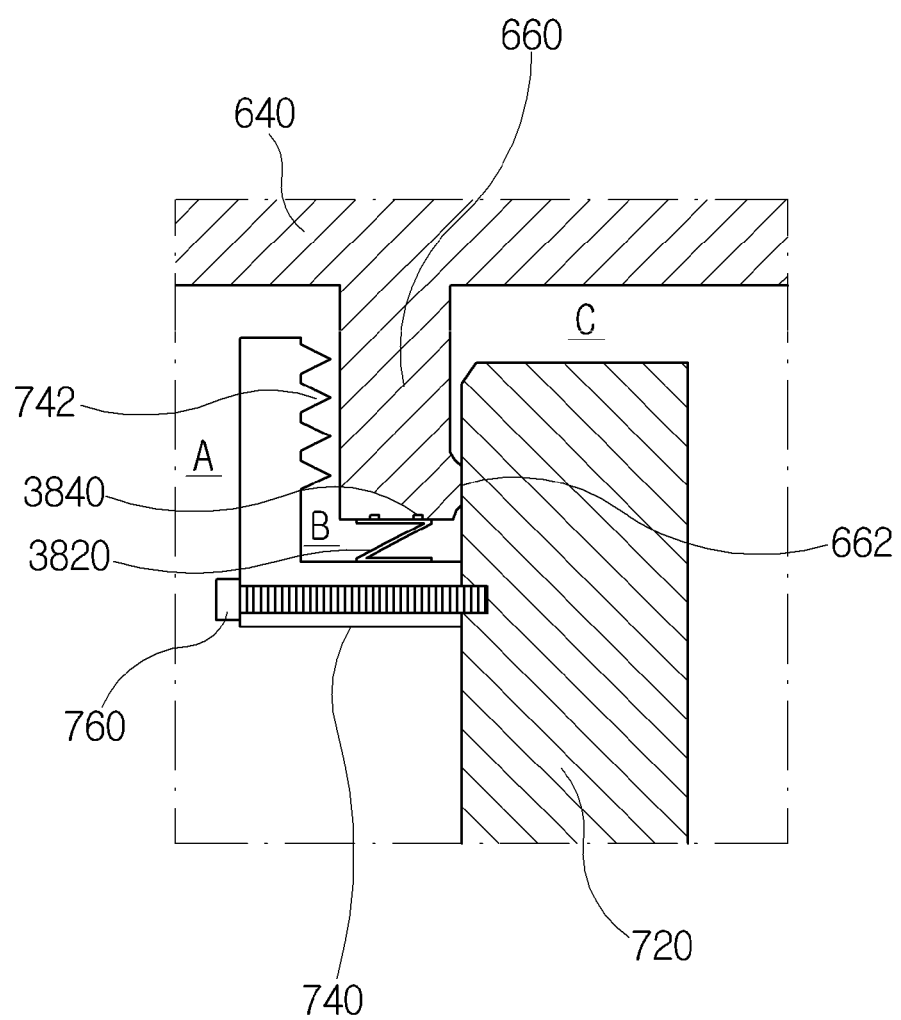

[FIG 12]
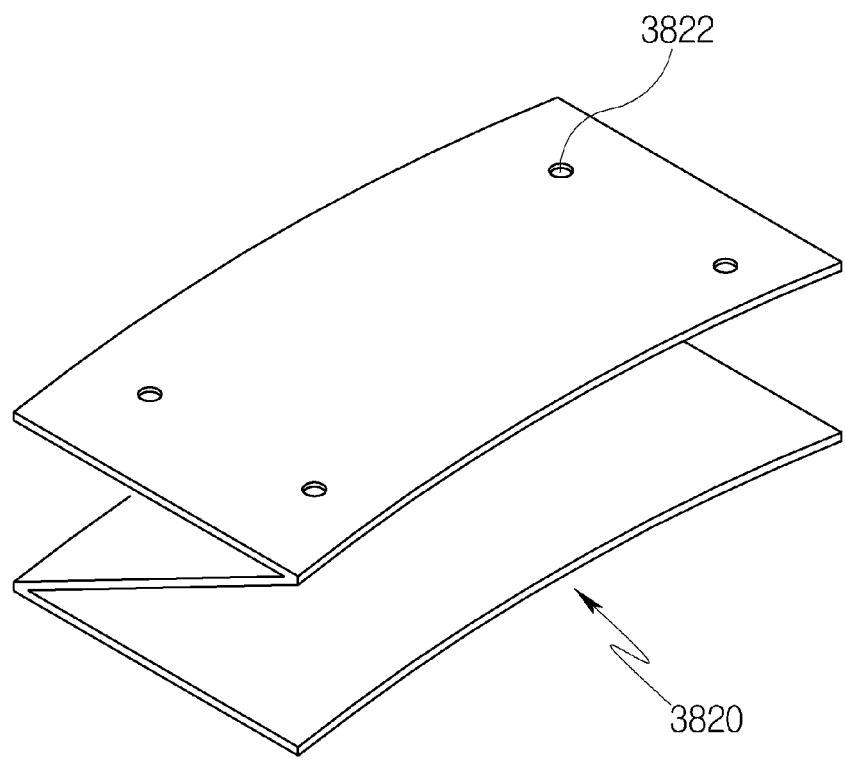

FIRST-STAGE TURBINE VANE SUPPORTING STRUCTURE AND GAS TURBINE INCLUDING SAME

CROSS REFERENCE TO RELATED APPLICATIONS

The present application claims priority to Korean Patent Application No. 10-2017-0155404, filed Nov. 21, 2017, the entire contents of which is incorporated herein for all purposes by this reference.

BACKGROUND OF THE INVENTION

1. Field of the Invention

The present invention relates to gas turbines. More particularly, the present invention relates to a first-stage turbine vane supporting structure capable of reducing chordal leakage between a first turbine vane segment and a supporting ring and to a gas turbine including the same.

2. Description of the Background Art

In general, a turbine refers to a mechanical device that extracts energy from a fluid, such as water, gas, or vapor, and converts it into useful mechanical work. A turbine is a turbo-machine with at least one moving part called a rotor assembly, which is a shaft with blades or vanes attached, in which a fluid is injected to impact the blades or vanes and cause a reaction force of the blades or vanes, thereby moving the rotor assembly at high speed. Turbines may be categorized into hydraulic turbines using the potential energy of water falling from an elevated position, steam turbines using thermal energy of vapor, air turbines using pressure energy of high-pressure compressed air, and gas turbines using energy of a high-pressure hot gas.

A gas turbine typically includes a compressor section, a combustor section, a turbine section, and a rotor. Such a gas turbine is known as a kind of combustion engine that converts thermal energy into mechanical energy by compressing air in the compressor section to produce high-pressure compressed air, mixing fuel with the compressed air and burning the resulting mixture in the combustor section to produce hot high-pressure combustion gas, and jetting the combustion gas into the turbine section to rotate the rotor. This gas turbine does not include a reciprocating mechanism such as a piston which is usually provided in a typical four-stroke engine. Therefore, it has no mutually frictional component such as a piston-and-cylinder, thereby consuming an extremely small amount of lubricating oil and reducing the operational amplitude which features the reciprocating mechanism. Thus, a gas turbine has an advantage of high speed operation.

The turbine includes multistage turbine blades rotating in conjunction with the rotor and multistage turbine vanes that are fixed to the inside surface of a casing and arranged to alternate with the multistage turbine blades.

FIG. 1 illustrates a portion of a contemporary turbine which includes a first-stage turbine vane 12 and a first-stage turbine blade 22. Here, the first-stage turbine blade 22 combined with a rotor 20 will rotate in conjunction with the rotor 20, and a first-stage turbine vane segment 10 is supported on a turbine casing 34. A conventional supporting structure for a first-stage turbine vane will be described below with reference to FIG. 1.

Referring to FIG. 1, the first-stage turbine vane segment 10 includes an outer platform 14 supported on the turbine casing 34, an inner platform 16 supported on a supporting ring 36 to be described below, and the first-stage turbine vane 12 disposed between the outer platform 14 and the inner platform 16. An inner rail 18 protrudes from the surface of the inner platform 16 in a radially inward direction of the turbine, and the supporting ring 36 engages with a radial end surface of the inner rail 18 to support the first-stage vane segment 10.

Specifically, the inner rail 18 has one side surface on which a protrusion 19 is disposed so as to protrude toward the supporting ring 36. The protrusion 19 linearly extends in a chordal shape. The protrusion 19 engages with an annular side surface of the supporting ring 36 in an airtight manner. The annular side surface is sealing surface facing the axial direction of the turbine.

However, a gap is highly likely to occur between the protrusion 19 and the sealing surface of the supporting ring 36 due to the thermal stress of the inner rail 18, which is attributable to the expansion of the vane 12 during the operation of the turbine or due to the warpage of the inner rail occurring during the operation or repair of the turbine. Therefore, there is a problem in that an arc-shaped leakage flow called chordal leakage occurs in a direction from a high-pressure gas region 42, which is a compressor discharge gas region and disposed at an inner side of the inner platform 16 in the radial direction, to a low-pressure gas region 44 formed between the first-stage turbine vane 12 and the first-stage turbine blade 22. It is difficult to prevent the flow of chordal leakage when the protrusion 19 fails to be in tight contact with the sealing surface of the supporting ring 36.

SUMMARY OF THE INVENTION

The present invention has been made to solve the problems occurring in the related art and is intended to provide a first-stage turbine vane supporting structure being capable of reducing chordal leakage between a first-stage turbine vane segment and a supporting ring, and a gas turbine including the same. In addition, the present invention is intended to provide a gas turbine including the structure.

In order to solve the problems and accomplish the objects described above, the present invention provides a structure for supporting a first-stage turbine vane. The structure may include a first-stage turbine vane segment including an outer platform, an inner platform, and a first-stage turbine vane disposed between the outer platform and the inner platform; an inner rail protruding from the inner platform in a longitudinal direction of the first-stage turbine vane; a supporting ring for supporting the first-stage turbine vane segment by engaging with the inner rail while facing one surface of the inner rail; a supporting member engaging with the supporting ring to define a U-shaped space bordered by three side surfaces surrounding the inner rail; and a flexible member interposed between the inner rail and one of the three side surfaces of the U-shaped space.

The structure may further include a fixing member for fixing the supporting member to the supporting ring.

The flexible member may be interposed between the supporting member and the inner rail, or between the supporting ring and the inner rail.

The structure may further include a protrusion formed on the one surface of the inner rail and configured to engage with a sealing surface of the supporting ring in an airtight manner.

The structure may further include a seal interposed between the inner rail and a side surface of the U-shaped space, the interposed seal including one of a brush seal and a labyrinth seal. The seal may be positioned closer to a high-pressure gas region present inside the inner platform than to a low-pressure region present opposite to the high-pressure region. The flexible member may be positioned closer to a low-pressure gas region than is the seal.

The flexible member may include an arch-shaped portion. The flexible member may further include opposite ends respectively engaged with the inner rail; and the arch-shaped portion may be supported, in an airtight manner, on one of two of the three side surfaces of the U-shaped space, the two side surfaces of the U-shaped space including a surface of the supporting member and a surface of the supporting ring. The flexible member may further include one end engaged with the inner rail and another end supported, in an airtight manner, on one of two of the three side surfaces of the U-shaped space, the two side surfaces of the U-shaped space including a surface of the supporting member and a surface of the supporting ring. The arch-shaped portion may be convex-curved toward a high-pressure gas region from a lower pressure gas region.

The flexible member may have a circular cross-section and may include a rigid core formed at a center position of the flexible member.

The flexible member may include a plurality of leaf springs arranged in a zigzag shape.

The flexible member may extend in a circumferential direction of the supporting ring to have an arch shape.

The inner rail may have an insertion groove to engage with a portion of the flexible member.

The flexible member may be installed in a compressed state.

The supporting ring and the supporting member may be integrally formed.

In addition, the present invention provides a gas turbine including a casing; a compressor disposed in the casing and configured to take air in and compress the air to produce high-pressure compressed air; a combustor for producing combustion gas by mixing the high-pressure compressed air with fuel and burning the mixture; and a turbine having turbine blades rotatable by the hot high-pressure combustion gas discharged from the combustor. The turbine may include an alternating arrangement of multistage turbine blade arrays and multistage turbine vane arrays in an axial direction of the turbine, the multistage turbine vane arrays including a first-stage turbine vane segment which includes an outer platform, an inner platform, and a first-stage turbine vane provided between the outer platform and the inner platform; an inner rail extending from the inner platform in a radially inward direction of the turbine; a supporting ring for supporting the first-stage turbine vane segment by engaging with the inner rail while facing in the axial direction of the turbine; the above supporting member; and the above flexible member.

The inner rail may include an arc-shaped protrusion formed on a side surface of the inner rail that faces in the axial direction of the turbine, the arc-shaped protrusion extending along a circumferential direction of the turbine and engaging with a sealing surface of the supporting ring in an airtight manner. The flexible member may extend in a circumferential direction of the supporting ring to have an arch shape, and the inner rail may have an insertion groove to engage with a portion of the flexible member, the insertion groove extending along the circumferential direction of the turbine.

According to the present invention, the flexible member may be provided in the U-shaped space defined by the inner rail, the supporting ring, and the supporting member. Therefore, when thermal stress occurs in the inner rail due to the expansion of the vane during the operation of the turbine or when warpage of the inner rail occurs during the operation or repair of the turbine, a gap (leak) is unlikely to be formed between the inner rail and the supporting ring. Therefore, it is possible to reduce or prevent a flow of chordal leakage from a high-pressure gas region to a low-pressure gas region.

Thus, the performance of the gas turbine is improved.

The effects, features, and advantages of the invention are not limited to the above effects, features, and advantages, and other effects, features, and advantages of the invention will be understood from a detailed description of the invention or the configurations recited in the accompanying claims.

BRIEF DESCRIPTION OF THE DRAWINGS

FIG. 1 is a cross-sectional view illustrating a portion of a gas turbine in a related art;

FIG. 2 is a cross-sectional view schematically illustrating the structure of a gas turbine according to a first embodiment of the present invention;

FIG. 3 is an enlarged view of a portion of FIG. 2;

FIG. 4 is an enlarged view of a portion Y of FIG. 3;

FIG. 5 is a perspective view of FIG. 4;

FIG. 6 is an exploded perspective view of a portion of FIG. 5;

FIGS. 7-11 are views of the portion Y of FIG. 3, respectively illustrating second through sixth embodiments of the present invention; and FIG. 12 is a perspective view of a flexible member of the structure of FIG. 11.

DETAILED DESCRIPTION OF THE DISCLOSURE

Hereinbelow, preferred embodiments of a first-stage turbine vane supporting structure and a gas turbine including the supporting structure, according to the present invention, will be described with reference to FIGS. 2 to 12.

It is to be understood that the terms used herein are defined in consideration of the functions of the present invention, and may be altered according to the intent of a user or operator, or conventional practice. Therefore, the terms should be defined on the basis of the entire content of this specification. Embodiments of the present invention described blow are presented to make complete the disclosure of the present invention and help those who are ordinarily skilled in the art best understand the invention. The embodiments are for describing particular aspects only and are not intended to be limiting of the present invention.

A description of elements that are not related to the invention will be omitted to clarify the invention, and identical or similar elements are denoted by identical or similar reference characters throughout the drawings and the detailed description below. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinbelow, a gas turbine according to one embodiment of the present invention will be described with reference to FIG. 2.

According to one embodiment of the present invention, a gas turbine 1 includes a casing 100, a compressor 200 disposed in the casing 100 and configured to take air in and compress the air to produce high-pressure compressed gas, a combustor 300 for mixing the compressed air produced by the compressor 200 with fuel and burning the fuel-and-air mixture to produce hot high-pressure combustion gas, and a turbine 400 in which a plurality of turbine blades is rotated by the hot high-pressure combustion gas ejected from the combustor 300, thereby generating electricity.

The casing 100 includes a compressor casing 102 for accommodating the compressor 200, a combustor casing 103 for accommodating the combustor 300, and a turbine casing 104 for accommodating the turbine 400. The configuration of the casing is not limited to this. For example, the compressor casing, the combustor casing, and the turbine casing may be integrally formed.

The compressor casing 102, the combustor casing 103, and the turbine casing 104 are arranged, in this order, from the upstream end to the downstream end of the gas turbine 1.

A rotor 500 (central shaft) is rotatably provided inside the casing 100. An electric generator (not illustrated) is connected to the rotor 500 for the generation of electricity. A diffuser is provided at a downstream end of the casing 100 to discharge the combustion gas passing through the turbine 400.

The rotor 500 includes a compressor rotor disc 520 accommodated in the compressor casing 102; a turbine rotor disc 540 accommodated in the turbine casing 104; a torque tube 530 accommodated in the combustor casing 103 and configured to connect the compressor rotor disc 520 and the turbine rotor disc 540; and a tie rod 550 and a nut 560 for fastening the compressor rotor disc 520, the torque tube 530, and the turbine rotor disc 540.

The rotor may include multiple rotor discs 520, for example, fourteen rotor discs. The rotor discs 520 are arranged in an axial direction of the rotor 500. The compressor rotor discs 520 may be arranged in multiple stages, each disc forming one stage. Each of the compressor rotor discs 520 has an overall disc shape. The outer circumferential surface of each compressor rotor disc 520 is provided with multiple compressor blade coupling slots into which respective compressor blades 220, which will be described later, are inserted to be retained to the compressor rotor disc 520.

The turbine rotor discs 540 have substantially the same configuration as the compressor rotor discs 520. That is, like the compressor rotor discs, there are multiple rotor discs 540 which are arranged in the axial direction of the rotor 500. The turbine rotor discs 540 are arranged in multiple stages, each disk forming one stage. Each of the turbine rotor discs 540 has an overall disc shape. The outer circumferential surface of each turbine rotor disc 540 is provided with multiple turbine blade coupling slots into which respective turbine blades 420, which will be described later, are inserted to be retained to the turbine rotor disc 520.

The torque tube 530 is a torque transfer member that transfers the rotary force of the turbine rotor discs 540 to the compressor rotor discs 520. One end (hereinafter referred to as a first end) of the torque tube 530 is fastened to a compressor rotor disc 520 located at a downstream end, and the other end (hereinafter referred to as a second end) of the torque tube 530 is fastened to a turbine rotor disc 540 located at an upstream end. Each of the first end and the second end of the torque tube 530 is provided with a protrusion, and each of the compressor rotor disc 520 and the turbine rotor disc 540 is provided with a recess to engage with a corresponding protrusion of the protrusions of the torque tube 530. Therefore, relative rotation of the torque tube 530 with respect to the compressor rotor disc 520 and the turbine rotor disc 540 can be prevented.

In addition, the torque tube 530 has a hollow cylinder shape so that the air supplied from the compressor 200 can flow through the torque tube 530 to the turbine 400. Taking the characteristics of a gas turbine into account which operates continuously for a long period of time, the torque tube 530 is formed to withstand high temperatures so as not to be deformed or twisted. The torque tube 530 is preferably formed to be easily assembled and disassembled for easy maintenance.

The tie rod 550 is installed to extend through the multiple compressor rotor discs 520, the torque tube 530, and the multiple turbine rotor discs 540. One end (hereinafter referred to as a first end) of the tie rod 550 is connected to an inner portion of the farthest upstream compressor rotor disc 520 among the multiple compressor rotor discs 520, and the other end (hereinafter referred to as a second end) of the tie rod 550 protrudes from the farthest downstream turbine rotor disc 540 among the multiple turbine rotor discs 540 and engages with the fixing nut 560.

The fixing nut 560 presses the turbine rotor disc 540 toward the compressor 200 so that the spacing between the compressor rotor discs 520 and the turbine rotor discs 540 can be reduced. Thus, the multiple compressor rotor discs 520, the torque tube 530, and the multiple turbine rotor discs 540 can be compactly arranged in the axial direction of the rotor 500. Therefore, the axial movement and relative rotation of the multiple compressor rotor discs 520, the torque tube 530, and the multiple turbine rotor discs 540 are prevented.

Although the present embodiment presents a configuration in which one tie rod extends through the centers of the multiple compressor rotor discs, the torque tube, and the multiple turbine rotor discs, the present invention is not limited thereto. That is, the compressor section and the turbine section may have respective tie rods, multiple tie rods may be radially arranged in a circumferential direction, or a combination of these types may be employed.

The rotor 500 may be rotatably supported on bearings located at opposite ends of the rotor 500, and one end of the rotor 500 may be connected to a drive shaft of the electric generator.

The compressor 200 includes compressor blades 220 rotating along with the rotor 500 and compressor vanes 240 combined with the casing 100 in a manner of guiding the flow of air to the turbine blades 220. Here, a plurality of compressor blades 220 are provided for each of multiple stages arranged in the axial direction of the rotor 500. In each stage, the plural blades 220 are radially arranged in the rotation direction of the rotor 500.

That is, the root member 222 of each compressor blade 220 is received in a corresponding compressor blade coupling slot of the compressor rotor disc 520. The root members 222 have a fir-tree shape to prevent the compressor blades 220 from escaping from the compressor blade coupling slots in the radial direction of the rotor 500. In this case, the compressor blade coupling slots also have a fir-tree shape corresponding to the shape of the root members 222 of the compressor blades.

Although the embodiment provides a configuration in which the compressor blade root members 222 and the compressor blade coupling slots have a fir-tree shape, the present invention is not limited thereto. That is, the compressor blade root members and the compressor blade coupling slots may have a dovetail shape. Alternatively, the compressor blades may be coupled to the compressor rotor disc by different types of coupling means, such as a key or a bolt.

Here, typically the compressor blades 220 are tangentially or axially coupled to the compressor rotor disc 520. In the present embodiment, the compressor blade root members 220 are of a so-called axial type. That is, the compressor blade root members 220 are inserted into the compressor blade coupling slots, respectively, in an axial direction of the rotor 500. According to the present embodiment, each compressor rotor disk has multiple compressor blade coupling slots which are radially arranged to be spaced in a circumferential direction of the compressor rotor disk 520.

Meanwhile, a plurality of compressor vanes 240 are provided for each of multiple stages arranged in an axial direction of the rotor 500. The compressor vanes 240 and the compressor blades 220 are alternately arranged in the direction of flow of air. In each stage, the compressor vanes 240 are radially arranged along a direction of rotation of the rotor 500.

Some of the compressor vanes 240 are variable guide vanes that are coupled to the compressor casing 102 such that the angles of the compressor vanes 240 are adjustable to control the flow rate of air fed into the compressor 200.

The combustor 300 mixes fuel with the compressed air supplied from the compressor 200 and burns the mixture to produce hot high-pressure gas having high energy and heats the combustion gas through an isobaric combustion process up to heat resistant temperatures of the combustor and the turbine.

There are multiple combustors 300 which are radially arranged along the circumferential direction of the combustor casing, i.e., the direction of rotation of the rotor 500. Each of the combustors 300 includes a liner section into which the compressed air is introduced from the compressor 200, a burner which mixes fuel with the compressed air introduced into the liner and burns the fuel-and-air mixture to produce combustion gas, and a transition piece 320 that guides the combustion gas to the turbine 400.

The liner section includes a liner forming a flame tube (called a combustion chamber) and a flow sleeve surrounding the flame tube to define an annular space formed between the flow sleeve and the liner.

The burner includes a fuel spray nozzle provided at a front end (compressor side end) of the liner section so as to spray fuel toward the air introduced into the combustion chamber, and an ignition plug disposed in the wall of the liner section to ignite the fuel and air mixture.

The transition piece 320 is constructed such that its outer wall is cooled by the air supplied from the compressor so that the transition piece 320 may not be damaged by the heat of the hot combustion gas. In addition, the transition piece 320 has cooling holes so that the air is introduced into the transition piece 320 through the cooling holes, thereby cooling the body of the transition piece 320. The air used to cool the transition piece 320, i.e., the air passing through the transition piece 320 flows to the annular space of the liner section. In addition, external air is also introduced into the annular space through cooling holes formed in the flow sleeve, thereby impinging on the outer wall surface of the liner.

Although not illustrated in the drawings, a deswirler serving as a guide vane is provided between the compressor 200 and the combustor 300. The deswirler functions to adjust the inlet angle of the air introduced into the combustor 300 to match the designed inlet angle.

The turbine 400 may have substantially the same structure as the compressor 200. That is, the turbine 400 includes turbine blades 420 rotating together with the rotor 500 and turbine vanes 440 fixed to the casing 100 to guide the flow of air supplied to the turbine blades 420.

A plurality of turbine blades 420 are provided for each of multiple stages arranged in the axial direction of the rotor 500. In each stage, the turbine blades 420 are radially arranged to be spaced in the direction of rotation of the rotor 500. That is, the root member 422 of each turbine blade 420 is received in a corresponding turbine blade coupling slot of the turbine rotor disc 540. The root members 422 have a fir-tree shape to prevent the turbine blades 420 from escaping from the turbine blade coupling slots in the radial direction of the rotor 500. In this case, the turbine blade coupling slots also have a fir-tree shape corresponding to the shape of the root members 422 of the turbine blades.

Although the embodiment provides a configuration in which the turbine blade root members 422 and the compressor blade coupling slots have a fir-tree shape, the present invention is not limited thereto. That is, the turbine blade root members 422 and the turbine blade coupling slots may have a dovetail shape. Alternatively, the turbine blades may be coupled to the turbine rotor disc by different types of coupling means, such as a key or a bolt.

Typically, the turbine blades 420 are tangentially or axially coupled to the turbine rotor disc 540. In the present embodiment, the turbine blade root members 422 are of a so-called axial type. That is, the turbine blade root members 422 are inserted into the turbine blade coupling slots, respectively, in an axial direction of the rotor 500. In the present embodiment, each turbine rotor disk has multiple turbine blade coupling slots which are radially arranged in a circumferential direction of the turbine rotor disk 540.

In the present embodiment, a plurality of turbine vanes 440 may be provided for each of multiple stages arranged in the axial direction of the rotor 500. The turbine vanes 440 and the turbine blades 420 are alternately arranged in the direction of flow of air. In each stage, the turbine vanes 440 are radially arranged to be spaced in the direction of rotation of the rotor 500.

Specifically, each stage of the turbine vanes 440 is provided as an annular array or assembly composed of a plurality of turbine vane segments. Each turbine vane segment includes one or more turbine vanes 440 and inner and outer platforms radially spaced from one another. When the turbine vane segments are assembled, the turbine vanes 440 are spaced from each other in the circumferential direction, thereby forming an annular array of turbine vanes between the outer platform and the inner platform.

The turbine vane segment is supported by the turbine casing 104. Specifically, the outer platform is supported by an outer casing, and the inner platform is supported by an inner casing.

FIG. 3 illustrates a first-stage turbine vane segment 600 which is a constituent element of a first-stage turbine vane array among multistage turbine vane arrays. The first-stage turbine vane segment 600 includes an outer platform 620, an inner platform 640, and one or more (at least one) first-stage turbine vanes 441 disposed between the outer platform 620 and the inner platform 640.

The outer platform 620 is combined with and supported by the outer casing of the turbine casing 104, and the outer casing of the turbine casing 104 corresponds to an outer retaining ring.

Similarly, the inner platform 640 is supported by the inner casing of the turbine casing 104, and is specifically supported by a supporting ring 720 and a supporting member 740 so as to perform the axial movement.

In addition, an inner rail 660 is provided on the inner platform 640 to extend in a radially inward direction of the turbine, that is, in a longitudinal direction of the first-stage turbine vane 441. As described below, the inner rail 660 on the inner platform 640 is supported by the supporting ring 720 and the supporting member 740.

Unlike the compressor 200, the turbine 400 needs to be equipped with a cooling unit which prevents the turbine 400 from being damaged or deteriorated by heat of the hot high-pressure combustion gas because the turbine 400 comes into direct contact with the hot high-pressure combustion gas.

Therefore, the gas turbine according to the present embodiment may further include a cooling passage (not shown) through which a portion of the compressed air is bled into the turbine 400 from the compressor 200. In the present embodiment, the cooling passage may be an external passage that externally extends to an inside portion of the casing 100 or an internal passage that extends through the rotor 500. Alternatively, the cooling passage may be a combination of the external passage and the internal passage. The cooling passage is formed to communicate with a turbine blade cooling channel (not shown) formed in the turbine blade 420 so that the turbine blade 420 can be cooled by cooling air. The turbine blade cooling channel is formed to communicate with a turbine blade film cooling hole (not shown) formed in the surface of the turbine blade 420 so that the cooing air can be supplied to the surface of the turbine blade 420. Therefore, the turbine blade 420 can be cooled by the cooling air in a film cooling manner.

The turbine vane 440 is structured similarly to the turbine blade 420 such that the turbine vane 420 is cooled by the cooling air supplied through the cooling passage.

The gas turbine 1 structured as described above operates in a manner described below. First, air is introduced into the housing 100 and compressed by the compressor 200. The resulting compressed air is mixed with fuel and burned by the combustor 300, generating combustion gas which is in turn introduced into the turbine 400. In the turbine 400, the combustion gas passes over the turbine blades 420 to rotate the rotor 500 and then exits the turbine through the diffuser. The rotor 500 rotated by the combustion gas provides a rotational force which drives the compressor 200 and the electric generator. That is, a part of the mechanical energy generated by the turbine is provided as energy which is harnessed by the compressor to compress air and the other part is provided as energy that is harnessed by the electric generator to generate electricity.

Here, the gas turbine described above is presented as only one embodiment of the present invention. A first-stage turbine vane supporting structure described below can be applied to various types of gas turbines.

Referring to FIGS. 3 to 6, the first-stage turbine vane supporting structure according to one embodiment of the present invention will be described below.

As described above, the inner rail 660 provided on the inner platform 640 is supported by the supporting ring 720 and the supporting member 740. The inner rail 660 extends from the surface of the inner platform 640 in a radially inward direction of the turbine 400. Further, the supporting ring 720 axially engages with the inner rail 660 while facing one side surface of the inner rail 660, thereby supporting the first-stage turbine vane segment 600. In the present embodiment, specifically, the supporting ring 720 faces the downstream side surface of the inner rail 660.

In addition, the supporting member 740 engages with the supporting ring 720 and thus together form a U-shaped space surrounding the inner rail 660 on three sides. Thus, the U-shaped space defined by the supporting member 740 engaging with the supporting ring 720 is bordered by three side surfaces surrounding the inner rail 660, the three side surfaces including two surfaces of the supporting member 740 and one surface of the supporting ring 720. The supporting member 740 has an L-shaped cross-section to enfold (cover) two surfaces of the inner rail 660, namely, its upstream side surface and its radial end surface. The downstream side surface of the inner rail 660 is not covered by the supporting member 740, because the downstream side surface of the inner rail 660 is covered by an axially extending portion of the supporting ring 720.

In the present embodiment as shown in FIG. 4, the supporting member 740 is fixed to the supporting ring 720 by a fixing member 760. The fixing member 760 may be of any suitable type, such as screws, bolts, etc. However, the method of coupling the supporting member 740 and the supporting ring 720 is not limited thereto. That is, the supporting ring 720 and the supporting member 740 may be integrally formed instead of being coupled by the fixing member.

The supporting ring-side surface of the inner rail 660 is provided with a protrusion 662, which engages with a sealing surface of the supporting ring 720 in an airtight manner. That is, the protrusion 662 protrudes from the downstream side surface of the inner rail 660 and extends in the circumferential direction of the turbine 400 to form an arc shape. Accordingly, the protrusion 662 engages with the sealing surface of the supporting ring 720 to provide an airtight sealed state. The sealing surface of the supporting ring 720 may be provided with a groove (not shown) to engage with the protrusion 662. This structure has an advantage of preventing a leakage flow.

Referring to FIG. 4, a high-pressure compressor discharge gas flows in a high-pressure region A present inside the inner platform 640 in the radial direction. Meanwhile, a low-pressure high-temperature gas flows in a low-pressure region C present along a high temperature gas path extending from the transition piece 320 to the first-stage turbine blade 421 via the first-stage turbine vane 441, as shown in FIG. 3. Thus, the low-pressure region C is present in opposition to the high-pressure region A. The structure of the present embodiment as described above with reference to FIG. 4 is devised to prevent a leakage flow between the high-pressure region A and the low-pressure region C.

However, a gap is likely to be created between the sealing surface of the supporting ring 720 and the protrusion 662 due to the warpage of the inner ring during the operation or repair of the turbine or due to the thermal stress in the inner ring attributable to the expansion of the first-stage turbine vane 441 during the operation of the turbine. The gap leads to the leakage flow from the high-pressure region A to the low-pressure region C. Therefore, a more secure prevention of the gas leakage between the supporting ring 720 and the inner rail 660 is required.

To this end, this invention uses a flexible member 820 inserted in the U-shaped space defined by the inner rail 660, the supporting ring 720, and the supporting member 740.

The flexible member extends along the circumferential direction of the turbine 400 to form an overall arc shape. The flexible member 820 also has an arch-shaped cross-section in general. In one embodiment, the flexible member 820 is interposed between the supporting member 740 and the inner rail 660, to be disposed between the radial end surface of the inner rail 660 and the opposing surface of the supporting member 740.

In the present embodiment, the cross-section of the flexible member 820 has a curved middle portion and flat end portions which engage with the inner rail 660. That is, the cross-section of the flexible member 820 may have a shape similar to the Greek letter omega (Ω).

Accordingly, the flat end portions of the flexible member 820 are each coupled to the inner rail 660, and the middle portion (arch-shaped portion) is supported on the supporting member 740 in an airtight manner.

In addition, the inner rail 660 is provided with an insertion groove 664 to engage with flat end portions of the flexible member 820. In this way, the inner rail 660 and the flexible member 820 are coupled.

The insertion groove 664 extends in the circumferential direction of the turbine 400 to form an annular shape while having an arch-shaped cross-section. In the present embodiment, the insertion groove 664 may be composed of a main groove and an opposing pair of side grooves respectively communicating with the main groove. The main groove may be recessed in the radial direction of the turbine 400, and the side grooves may extend axially from opposite sides of the main groove in order to receive the flat end portions of the flexible member 820, respectively. That is, to couple the flexible member 820 with the insertion groove 664, the flat end portions of the flexible member 820 are inserted into the side grooves of the insertion groove 664.

In this case, the main groove may have a size that is sufficient to receive the flexible member 820 while accommodating the deformation of the flexible member 820 which occurs due to the expansion or warpage of the inner rail 660, namely, the expansion or warpage of the first-stage turbine segment 600. That is, an inner wall surface of the main groove may be spaced from the inserted flexible member 820 by a predetermined distance.

However, the invention is not limited to the above-described configuration. For example, the inner rail 660 may not be provided with the insertion groove 664, and the flat end portions of the flexible member 820 may be fixed to the inner rail 660 by fixing means.

Accordingly, even though thermal stress occurs due to expansion of the first-stage vane 441 during the operation of the turbine, or warpage occurs during the operation or repair of the turbine, since the flexible member 820 contracts or expands to accommodate the expansion or warpage of the first-stage turbine vane, the air-tight sealed state between the inner rail 660 and the supporting member 740 can be maintained, thereby reducing or preventing chordal leakage from the high-pressure region A to the low-pressure region C.

Therefore, the performance of the gas turbine improves. In the embodiment, the flexible member 820 may be installed in a compressed state.

In addition, a labyrinth seal 742 may be provided in the U-shaped space defined by the inner rail 660, the supporting ring 720, and the supporting member 740. In this case, the labyrinth seal 742 is preferably positioned closer to the high-pressure region A while being disposed to face the inner rail 660. In the present embodiment, the labyrinth seal 742 is provided between the upstream side surface of the inner rail 660 and the opposing surface of the supporting member 740. In addition, the labyrinth seal 742 may be integrally formed with the supporting member 740.

However, the invention is not limited to the above configuration. For example, the labyrinth seal 742 may be disposed at a different position, such as on the surface of the inner rail 660.

The labyrinth seal 742 reduces the leakage flow path of the compressor discharge gas residing in the high-pressure region A. When the compressor discharge gas passes through each of multiple projections of the labyrinth seal 742, the hydraulic pressure of the compressor discharge gas decreases and the gas flow slows. In other words, when the compressor discharge gas comes out of the high-pressure region A and then passes the labyrinth seal 742, the pressure of the compressor discharge gas is reduced. Therefore, an intermediate-pressure region B is formed at an area positioned downstream from the labyrinth seal 742. The pressure of the intermediate-pressure region B is lower than the pressure of the high-pressure region A.

Accordingly, a pressure difference between the intermediate-pressure region B and the low-pressure region C decreases by employing the labyrinth seal 742, so that the phenomenon in which the gas tends to leak to the low-pressure region C through a gap between the inner rail 660 and the supporting ring 720 or a gap between the inner rail 660 and the supporting member 740 is reduced.

In this case, the flexible member 820 is preferably positioned closer to the low-pressure region C than is the labyrinth seal 742. In other words, in the present embodiment, the flexible member 820 is provided between the radial end surface of the inner rail 660 and the opposing surface of the supporting member 740, and thus the flexible member 820 is positioned downstream from the labyrinth seal 742.

Since the flexible member 820 is provided between the intermediate pressure region B, in which the pressure of the gas is lower than the pressure in the high-pressure region because the gas reaches the intermediate pressure region B via the labyrinth seal 742, and the low-pressure region C, a tendency that the gas flows from the upstream side to the downstream side of the flexible member 820 is reduced. Therefore, the sealing effect provided by the flexible member 820 is increased.

Hereinbelow, further embodiments of the present invention will be described. These embodiments are modifications in the structure of the first embodiment. Therefore, only differences of the other embodiments will be described.

First, as illustrated in FIG. 7, according to a second embodiment of the present invention, instead of the labyrinth seal 742 provided in the first embodiment, a brush seal 744 is provided in the U-shaped space defined by the inner rail 660, the supporting ring 720, and the supporting member 740. The brush seal 744 is preferably positioned closer to the high-pressure region A while being disposed to face the inner rail 660. In the present embodiment, the brush seal 744 is provided between the upstream side surface of the inner rail 660 and the opposing surface of the supporting member 740 and is preferably formed on the supporting member 740.

However, the invention is not limited to the above configuration. For example, the brush seal 744 may be disposed at a different location, such as on the surface of the inner rail 660.

The brush seal 744 reduces the leakage flow path of the compressor discharge gas residing in the high-pressure region A. When the compressor discharge gas passes through the brush seal 744, the hydraulic pressure of the gas decreases and the gas flow slows. That is, a pressure difference between the intermediate pressure region B and the low-pressure region C decreases, so that the leakage phenomenon in which the gas tends to leak to the low-pressure region C through a gap between the inner rail 660 and the supporting ring 720 or a gap between the inner rail 660 and the supporting member 740 is reduced.

In this case, the flexible member 820 is preferably positioned closer to the low-pressure region C than the brush seal 744.

Next, as illustrated in FIG. 8, according to a third embodiment of the present invention, the flexible member 820 is provided between the inner rail 660 and the supporting ring 720, instead of between the inner rail 660 and the supporting member 740 as in the first or second embodiment.

More specifically, the flexible member 820 is provided between the downstream side surface of the inner rail 660 and the opposing surface of the supporting ring 720. In this case, the flexible member 820 is positioned closer to the low-pressure region C than the protrusion 662 of the inner rail 660.

To this end, the insertion groove 664 of the inner rail 660 is formed in the downstream side surface of the inner rail 660.

In this case, the shape of the flexible member 820 and the shape of the insertion groove 664 are the same as those of the first embodiment. Therefore, a detailed description thereof will be omitted. This embodiment also has the same effect as the first embodiment. That is, although the thermal stress or warpage of the inner rail occurs due to the expansion of the first-stage turbine vane 441, since the flexible member 820 contracts or expands to accommodate the warpage or thermal stress, chordal leakage from the high-pressure region A to the low-pressure region C is reduced or prevented.

In addition, as illustrated in FIG. 9, according to a fourth embodiment of the present invention, positions of the flexible member and the insertion groove are the same as in first embodiment, but the shapes of the flexible member and the insertion groove are different from those in the first embodiment.

Specifically, in the present embodiment, a flexible member 1820 is interposed between a radial end surface of the inner rail 660 and the opposing surface of the supporting member 740. In addition, the flexible member 1820 includes a C-shaped middle portion that is curved and flat end portions respectively extending straight from each side of the C-shaped middle portion. The flat end portions of the flexible member 1820 may be termed first and second ends, respectively.

Accordingly, a first end of the flexible member 1820 engages with the inner rail 660 and a second end is supported on the supporting member 740 in an airtight manner. In this case, the curved portion includes a convex-curve toward the high-pressure region A from the low-pressure region C. In other words, the curved portion has a C shape having ends disposed on the lower pressure region side, and a middle portion of the C-shaped curved portion is disposed on the high-pressure region side.

The inner rail 660 is provided with an insertion groove 1664 to engage with a portion of the flexible member 1820. In the present embodiment, the insertion groove 1664 may be composed of a main groove and at least one side groove communicating with the main groove. The main groove may be recessed in the radial direction of the turbine 400, and the side groove may extend axially from one side of the main groove in order to receive one of the flat end portions of the flexible member 1820. That is, to couple the flexible member 1820 with the insertion groove 1664, one end of the flexible member 1820 can be locked in one or the other of the side grooves.

In this case, the main groove may have a size that is sufficient to receive the flexible member 1820 while accommodating the deformation of the flexible member 1820 which occurs due to the expansion or warpage of the inner rail 660, namely, the expansion or warpage of the first-stage turbine segment 600. That is, an inner wall surface of the main groove may be spaced from the inserted flexible member 1820 by a predetermined distance.

Accordingly, the flat end portions of the flexible member 1820 are respectively in tight contact with the inner rail 660 and the supporting member 740 to provide airtight sealing between the high-pressure region A and the low-pressure region C. The curved portion of the flexible member 1820 contracts or expands to accommodate the warpage or thermal stress attributable to the expansion of the first-stage turbine vane, thereby reducing or preventing chordal leakage from the high-pressure region A to the low-pressure region C.

In this case, the flexible member 1820 may be installed in a compressed state so as to be easily expandable. The curved portion of the flexible member 1820 is convex-curved toward the high-pressure region side from the low-pressure region side. Therefore, when the curved portion expands, the curved portion receives a force directed to the lower pressure region C side from the high-pressure region A side, so that the sealing can be easily maintained.

In addition, as illustrated in FIG. 10, according to a fifth embodiment of the present invention, positions of a flexible member and an insertion groove are the same as the flexible member 820 and the insertion groove 664 in the first embodiment, but the shapes of the flexible member and the insertion groove are different.

Specifically, in the present embodiment, a flexible member 2820 is interposed between a radial end surface of an inner rail 660 and the opposing surface of a supporting member 740. The flexible member 2820 is formed to have a circular cross-section having a center position 2822 where a rigid core of the flexible member 2820 is formed. That is, the flexible member 2820 includes a rigid core formed at its geometric center. It should be appreciated that FIG. 10 shows the flexible member 2820 in a compressed state.

The inner rail 660 is provided with an insertion groove 2664 to engage with a portion of the flexible member 2820. In the present embodiment, the insertion groove 2664 is a radial recess for receiving a portion of the flexible member 2820.

In this case, the insertion groove 2664 is formed to have a surface spaced from the flexible member 2820 when the flexible member 2820 is received in the insertion groove 2664. Thus, the flexible member 2820 can easily deform according to the expansion or warpage of the inner rail 660 and/or the first-stage turbine vane segment 600.

Accordingly, the flexible member 2820 hermetically seals the gap between the inner rail 660 and the supporting member 740. The flexible member 2820 easily contracts or expands in the radial direction according to the warpage of the first-stage turbine vane 441 or the thermal stress attributable to the expansion of the first-stage turbine vane 441, thereby reducing or preventing chordal leakage from the high-pressure region side to the low-pressure region side.

In this embodiment, since the rigid core is provided at the center position 2822 of the flexible member, the center position 2822 of the flexible member 2820 is not easily displaced from the center of the insertion groove. The flexible member 2820 is received in the insertion groove in a compressed state so that the flexible member 2820 is easily expandable.

Finally, as illustrated in FIGS. 11 and 12, according to a sixth embodiment of the present invention, a flexible member is formed at the same position as in the first embodiment, but has a different shape. The sixth embodiment does not involve an insertion groove 664.

Specifically, in the sixth embodiment, a flexible member 3820 is interposed between a radial end surface of an inner rail 660 and the opposing surface of a supporting member 740. The flexible member 3820 may be composed of a plurality of leaf springs arranged in the radial direction to form a zigzag shape.

The flexible member 3820 may extend in the circumferential direction of the turbine 400 to form an overall arc shape.

Among the leaf springs, a leaf spring coupled to the inner rail 660 is provided with a plurality of tapped holes 3822. The flexible member 3820 can be screw-fixed to the inner rail 660 through the threaded holes.

However, the method of coupling the flexible member to the inner rail 660 is not limited to the above configuration. For example, the inner rail 660 may be provided with an insertion groove and the flexible member 3820 may be inserted into the insertion groove.

Accordingly, both the outermost leaf springs of the flexible member 3820 are in tight surface contact with the radial end surface of the inner rail 660 and the opposing surface of the supporting member 740, respectively, thereby providing an airtight seal between the inner rail 660 and the supporting member 740. The intermediate leaf springs of the flexible member 3820 contract or expand according to the thermal stress and warpage of the inner rail 660 attributable to the expansion of the first-stage turbine vane 441, thereby reducing or preventing chordal leakage from the high-pressure region side to the low-pressure region side.

In this embodiment, the flexible member 3820 may be installed in a compressed state so as to be easily expandable.

The present invention is not limited to the above-described specific embodiments and description, and various changes and modifications thereof may be made without departing from the scope of the present invention as defined in the appended claims by those skilled in the art. In addition, such variations may fall within the protection scope of the present invention.

What is claimed is:

1. A first-stage turbine vane supporting structure comprising:
   a first-stage turbine vane segment including an outer platform, an inner platform, and a first-stage turbine vane disposed between the outer platform and the inner platform;
   an inner rail protruding from the inner platform in a longitudinal direction of the first-stage turbine vane;
   a supporting ring for supporting the first-stage turbine vane segment by engaging with the inner rail while facing one surface of the inner rail;
   a supporting member having a radially disposed side and an axially disposed side and engaging with the supporting ring to define a U-shaped space bordered by three side surfaces surrounding the inner rail;
   a seal interposed between the inner rail and the radially disposed side of the supporting member, the interposed seal including one of a brush seal and a labyrinth seal; and
   a flexible member interposed between the inner rail and one side surface among the three side surfaces of the U-shaped space and positioned closer to a low-pressure gas region than is the seal,
   wherein the flexible member includes:
   one end engaged with the inner rail,
   another end supported on the one side surface of the U-shaped space in an airtight manner, the one side surface being one of a surface of the supporting member and a surface of the supporting ring, and
   an arch-shaped portion that is convex-curved toward a high-pressure gas region from the low-pressure gas region.

2. The first-stage turbine vane supporting structure according to claim 1, further comprising a fixing member for fixing the supporting member to the supporting ring.

3. The first-stage turbine vane supporting structure according to claim 1, wherein the flexible member is interposed between the supporting member and the inner rail.

4. The first-stage turbine vane supporting structure according to claim 1, wherein the flexible member is interposed between the supporting ring and the inner rail.

5. The first-stage turbine vane supporting structure according to claim 1, further comprising a protrusion formed on the one surface of the inner rail and configured to engage with a sealing surface of the supporting ring in an airtight manner.

6. The first-stage turbine vane supporting structure according to claim 1, wherein the seal is positioned closer to a high-pressure gas region present inside the inner platform than to a low-pressure region present opposite to the high-pressure region.

7. The first-stage turbine vane supporting structure according to claim 1, wherein the flexible member extends in a circumferential direction of the supporting ring to have an arch shape.

8. The first-stage turbine vane supporting structure according to claim 1, wherein the inner rail has an insertion groove to engage with a portion of the flexible member.

9. The first-stage turbine vane supporting structure according to claim 1, wherein the flexible member is installed in a compressed state.

10. A gas turbine comprising:
    a casing;
    a compressor disposed in the casing and configured to take air in and compress the air to produce high-pressure compressed air;
    a combustor for producing combustion gas by mixing the high-pressure compressed air with fuel and burning the mixture; and
    a turbine having turbine blades rotatable by the hot high-pressure combustion gas discharged from the combustor, the turbine comprising:
    an alternating arrangement of multistage turbine blade arrays and multistage turbine vane arrays in an axial direction of the turbine, the multistage turbine vane arrays including a first-stage turbine vane segment which includes an outer platform, an inner platform, and a first-stage turbine vane provided between the outer platform and the inner platform;
    an inner rail extending from the inner platform in a radially inward direction of the turbine;
    a supporting ring for supporting the first-stage turbine vane segment by engaging with the inner rail while facing in the axial direction of the turbine;
    a supporting member having a radially disposed side and an axially disposed side and engaging with the supporting ring to define a U-shaped space bordered by three side surfaces surrounding the inner rail;

a seal interposed between the inner rail and the radially disposed side of the supporting member, the interposed seal including one of a brush seal and a labyrinth seal; and a flexible member interposed between the inner rail and one side surface among the three side surfaces of the U-shaped space and positioned closer to a low-pressure gas region than is the seal, wherein the flexible member includes:

one end engaged with the inner rail, another end supported on the one side surface of the U-shaped space in an airtight manner, the one side surface being one of a surface of the supporting member and a surface of the supporting ring, and an arch-shaped portion that is convex-curved toward a high-pressure gas region from the low-pressure gas region.

11. The gas turbine according to claim 10, wherein the inner rail includes an arc-shaped protrusion formed on a side surface of the inner rail that faces in the axial direction of the turbine, the arc-shaped protrusion extending along a circumferential direction of the turbine and engaging with a sealing surface of the supporting ring in an airtight manner.

12. The gas turbine according to claim 10, wherein the flexible member extends in a circumferential direction of the supporting ring to have an arch shape, and wherein the inner rail has an insertion groove to engage with a portion of the flexible member, the insertion groove extending along the circumferential direction of the turbine.

\* \* \* \* \*